US011051059B2

(12) United States Patent
Dodson et al.

(10) Patent No.: US 11,051,059 B2
(45) Date of Patent: Jun. 29, 2021

(54) PLAYBACK SYNCHRONIZATION IN A GROUP VIEWING A MEDIA TITLE

(71) Applicant: Sony Interactive Entertainment LLC, San Mateo, CA (US)

(72) Inventors: Joseph Dodson, San Diego, CA (US); Mohammed A. Khan, Poway, CA (US)

(73) Assignee: Sony Interactive Entertainment LLC, Sunnyvale, CA (US)

( * ) Notice: Subject to any disclaimer, the term of this patent is extended or adjusted under 35 U.S.C. 154(b) by 18 days.

(21) Appl. No.: 14/476,548

(22) Filed: Sep. 3, 2014

(65) Prior Publication Data

US 2014/0373081 A1 Dec. 18, 2014

Related U.S. Application Data

(63) Continuation of application No. 13/631,622, filed on Sep. 28, 2012, now abandoned.

(51) Int. Cl.
*H04N 21/242* (2011.01)
*H04N 21/262* (2011.01)
(Continued)

(52) U.S. Cl.
CPC ....... *H04N 21/242* (2013.01); *H04N 21/2387* (2013.01); *H04N 21/24* (2013.01);
(Continued)

(58) Field of Classification Search
CPC .. H04N 21/2407; H04N 21/242; H04N 21/24; H04N 21/2402; H04N 21/262;
(Continued)

(56) References Cited

U.S. PATENT DOCUMENTS 5,642,171 A 6/1997 Baumgartner et al.
5,808,662 A * 9/1998 Kinney ................ G11B 27/002
348/14.1
(Continued)

FOREIGN PATENT DOCUMENTS

CN 101502111 A 8/2009
CN 102741842 A 10/2012
(Continued)

OTHER PUBLICATIONS

English Translation) of JP 2005-198243A (Year: 2005).*
(Continued)

*Primary Examiner* — Kunal Langhnoja
(74) *Attorney, Agent, or Firm* — JDI Patent; Joshua D. Isenberg; Robert Pullman (57) ABSTRACT

A method and apparatus for synchronizing the playback of a media title to a group of client device platforms is disclosed. A synchronizer may make adjustments to the playback modes of one or more client device platforms within a group watching the same media title in order to ensure synchronized playback. When a client device platform is behind the group its playback mode may be changed to a fast playback mode. When a client device platform is ahead of the group its playback mode may be changed to a slow playback mode. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

15 Claims, 4 Drawing Sheets

(51) Int. Cl.
| | |
|---|---|
| H04N 21/24 | (2011.01) |
| H04N 21/6543 | (2011.01) |
| H04N 21/4223 | (2011.01) |
| H04N 21/43 | (2011.01) |
| H04N 21/4788 | (2011.01) |
| H04N 21/81 | (2011.01) |
| H04N 21/432 | (2011.01) |
| H04N 21/2387 | (2011.01) |

(52) U.S. Cl.
CPC ..... *H04N 21/2402* (2013.01); *H04N 21/2407* (2013.01); *H04N 21/262* (2013.01); *H04N 21/26216* (2013.01); *H04N 21/4223* (2013.01); *H04N 21/4307* (2013.01); *H04N 21/4325* (2013.01); *H04N 21/4788* (2013.01); *H04N 21/6543* (2013.01); *H04N 21/812* (2013.01)

(58) Field of Classification Search
CPC ........... H04N 21/4223; H04N 21/4307; H04N 21/4325; H04N 21/4788; H04N 21/4305; H04N 21/23424; H04N 21/26616; H04N 21/2387; H04N 21/6543; H04N 21/812; H04N 21/26216; G06F 15/16
See application file for complete search history.

(56) References Cited

U.S. PATENT DOCUMENTS

| | | | |
|---|---|---|---|
| 6,097,894 A | 8/2000 | Suda | |
| 7,114,172 B2* | 9/2006 | Lord | 725/80 |
| 8,428,443 B2* | 4/2013 | Ljolje et al. | 386/343 |
| 8,849,948 B2* | 9/2014 | Gilson | G11B 27/005 709/217 |
| 8,893,022 B2* | 11/2014 | Akram | H04N 21/234318 709/231 |
| 8,990,317 B2* | 3/2015 | Buyukkoc | H04L 65/4038 709/206 |
| 9,215,510 B2* | 12/2015 | Wheatley | G06F 16/743 |
| 2003/0001977 A1 | 1/2003 | Wang | |
| 2004/0220926 A1 | 11/2004 | Lamkin et al. | |
| 2004/0261100 A1 | 12/2004 | Huber et al. | |
| 2006/0236352 A1* | 10/2006 | Scott, III | H04N 5/76 725/89 |
| 2007/0110074 A1* | 5/2007 | Bradley | H04L 67/1095 370/395.51 |
| 2007/0124737 A1* | 5/2007 | Wensley | G06F 9/546 719/314 |
| 2007/0271338 A1* | 11/2007 | Anschutz | G06Q 10/10 709/204 |
| 2008/0052739 A1 | 2/2008 | Logan | |
| 2008/0059986 A1* | 3/2008 | Kalinowski | H04N 5/44543 725/1 |
| 2008/0168505 A1* | 7/2008 | Saito et al. | 725/61 |
| 2008/0180574 A1 | 7/2008 | Sadowski | |
| 2009/0044216 A1* | 2/2009 | McNicoll | G11B 27/105 725/5 |
| 2009/0222520 A1* | 9/2009 | Sloo | H04N 7/17318 709/205 |
| 2009/0249222 A1* | 10/2009 | Schmidt | H04N 21/2368 715/751 |
| 2009/0276821 A1* | 11/2009 | Amento | H04N 7/17318 725/116 |
| 2010/0083324 A1* | 4/2010 | Smith | H04N 7/17318 725/109 |
| 2011/0063503 A1* | 3/2011 | Brand | H04N 5/4401 348/500 |
| 2012/0144435 A1* | 6/2012 | Spilo et al. | 725/78 |
| 2012/0311043 A1 | 12/2012 | Chen et al. | |
| 2013/0031266 A1* | 1/2013 | Gilson | G11B 27/005 709/232 |
| 2013/0198298 A1* | 8/2013 | Li | H04N 21/41407 709/206 |
| 2014/0096169 A1 | 4/2014 | Dodson et al. | |
| 2015/0089372 A1* | 3/2015 | Mandalia | G11B 27/10 715/720 |

FOREIGN PATENT DOCUMENTS

| | | |
|---|---|---|
| JP | 2001084662 A | 3/2001 |
| JP | 2005198243 A | 7/2005 |
| JP | 2007109281 A | 4/2007 |
| JP | 2008109245 A | 5/2008 |
| JP | 2008539611 A | 11/2008 |
| JP | 2009194758 A | 8/2009 |
| JP | 2013031026 A | 2/2013 |
| JP | 2013513315 A | 4/2013 |
| WO | 2006113626 A2 | 10/2006 |
| WO | 2011069035 A1 | 6/2011 |
| WO | 2011097762 A | 8/2011 |

OTHER PUBLICATIONS

Final Office Action for U.S. Appl. No. 13/631,622, dated Jun. 3, 2014.
International Search Report and Written Opinion for International Application No. PCT/US2013/067779, dated Feb. 20, 2014.
Non-Final Office Action for U.S. Appl. No. 13/631,622, dated Nov. 22, 2013.
European Search Report for EP Application No. PCT/US2013/067779, dated Apr. 29, 2016.
Japanese Office Action for JP Application No. 2015-531354, dated Mar. 8, 2016.
Korean Office Action for KR Application No. 2015-7008044, dated Jan. 19, 2016.
Chinese Office Action for CN Application No. 201380048388.6, dated Oct. 10, 2016.
Chinese Office Action for CN Application No. 201380048388.6, dated Jul. 20, 2017.
Chinese Office Action for CN Application No. 201380048388.6, dated Jan. 26, 2018.
First Examination Report dated Jul. 31, 2018 for Indian Patent Application No. 2153/DELNP/2015.
Summons to Oral Proceedings dated Mar. 22, 2019 for European Patent Application No. 13842278.7.

* cited by examiner

PLAYBACK SYNCHRONIZATION IN A GROUP VIEWING A MEDIA TITLE

CLAIM OF PRIORITY

This application is a continuation of U.S. patent application Ser. No. 13/631,622, filed Sep. 28, 2012, the entire contents of which are incorporated herein by reference.

FIELD OF THE DISCLOSURE

The present disclosure is related to the delivery of digital media over a network. Among other things, this application describes a method and apparatus for synchronizing media playback between a group of users who are each receiving a media title over a network at approximately the same time.

BACKGROUND OF THE INVENTION

Consuming media is often more entertaining when done with a group of people. Traditionally, groups of friends or acquaintances meet to watch movies or television shows at a private residence. In this environment, the individuals in the group are free to comment and discuss the content of the movie. For example, the group may compare the movie they are watching to another similar movie, or they may comment on the acting abilities of actors starring in the movie. This interaction may provide additional enjoyment to the group of friends that they otherwise would miss if they were watching the movie by themselves.

Recently, the use of text messaging, micro-blogging, video conferencing, and online chatting have allowed the group of friends watching a broadcast of an episode to communicate with each other without having to be in the same location. In order for the comments from individual users to be understood by the remainder of the group, it is desirable that the playback to each user is synchronized. A synchronized playback would ensure that at any given time, all of the users are viewing the same frame of the episode. If this is not the case, then comments might be taken out of context, spoil surprises, or be considered irrelevant to other users. Until recently, synchronizing playback has not been a problem, because most broadcast media was consumed live, and therefore had uniform starting times. With the proliferation of recording services such as TiVo, users are able to pause, fast-forward, rewind, record, and playback broadcast media at their own desired times. Additionally, the streaming of other media through services such as video-on-demand and over private networks have created a need to synchronize the playback of media when users do not start viewing a media title at the same time, or one of the viewers in the group momentarily pauses the media title. It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

A synchronizer may make adjustments to the playback modes of one or more client device platforms within a group watching the same media title in order to ensure synchronized playback. Synchronized playback allows users who are viewing the media title through their client device platforms to share their experiences and comments about the content through media such as, but not limited to, text messaging, online chatting, video conferencing, and micro-blogging. With the aid of a synchronizer, events including, but not limited to, pausing a media title, network latencies, and inconsistent start times may not disrupt the group viewing of a media title.

First, a synchronizer may synchronize a start time for a media title that will be viewed by a group of client device platforms. The synchronizer may aid in planning the scheduled starting time. The scheduled starting time may be delivered to the synchronizer by a first client device platform from the group. At the scheduled starting time, the members of the group may begin viewing the chosen media title. According to an additional aspect of the present disclosure, the first client device platform may provide the synchronizer with a list of client device platforms that will be viewing the chosen media title. Once all of the members of the group have logged into the system, the synchronizer may begin playing the chosen media title. According to yet another additional aspect of the present disclosure, a synchronizer may begin playback of a media title once a predetermined number of client device platforms have logged into the system and requested playback of the media title.

After the playback has begun, the synchronizer may begin monitoring the playback progress of each of the client device platforms within the group. If the client device platforms in the group are synchronized with each other, then the synchronizer continues to monitor the playback progress without making any alterations to the playback mode of each of the client device platforms. If the synchronizer detects that the playback in the group is not synchronized, then the synchronizer may change the playback mode of one or more of the client device platforms. Additionally, aspects of the present disclosure describe predictive monitoring that is capable of anticipating events that may cause the playback in the group to become unsynchronized. The synchronizer may change the playback mode of a client device platform from a standard playback mode to a fast playback mode in order to help a client device platform catch up to the rest of the group if it is behind. Alternatively, the synchronizer may change the playback mode of a client device platform from a standard playback mode to a slow playback mode in order to allow other client device platforms to catch up to the client device platform that is ahead. According to yet additional aspects of the present disclosure, the synchronizer may change the playback modes of a first subset of client device platforms in the group from a standard playback mode to a fast playback mode and change the playback modes of a second subset of client device platforms in the group from a standard playback mode to a slow playback mode.

Aspects of the present disclosure describe the synchronized playback of a media title 106. By way of example, and not by way of limitation, a media title 106 may be a movie, an episode of a television show, a song, a sporting event, a news cast, home movies, a picture slideshow, a talk show, or any other form of media that may be transmitted over a network. Media titles 106 may contain commercials. The commercials may have predefined lengths (i.e., 30 seconds for each commercial), or they may each be of a variable length. Media titles 106 may also contain blank frames that are intermixed between frames of the media title 106. The media titles 106 may have been specially designed for synchronized playback, and therefore have predefined buffer zones that may be added or removed to allow for a faster or slower playback rate. Alternatively, a media title 106 may not have anticipated the use of synchronizing technology when it was produced, and therefore the adjustments to the playback rate of the media title 106 may be determined by the synchronizer 102.

Figure 1:
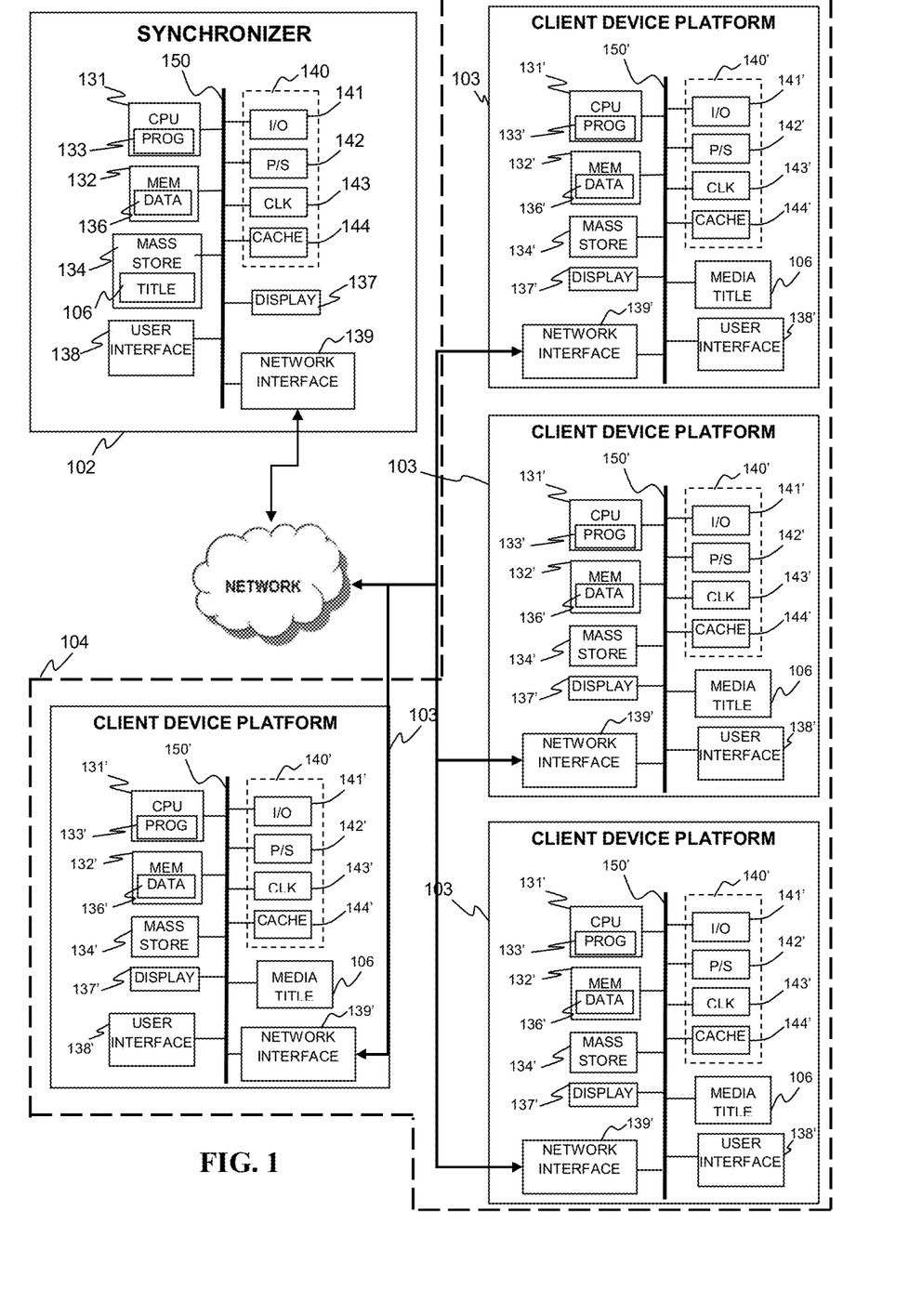
FIG. 1 is a schematic diagram of a synchronizer and several client device platforms communicating over a network according to an aspect of the present disclosure.

FIG. 1 is a schematic diagram illustrating components that may interact to implement synchronization of a playback progress of a media title 106 being consumed by a plurality of devices. A plurality of client device platforms 103, which are each part of a group 104, may access a synchronizer 102 over a network 160, which maybe, e.g., a local area network (LAN) or a wide area network (WAN). While only four client device platforms are shown in FIG. 1, aspects of the present disclosure are not so limited.

Synchronizer 102 may include a central processor unit (CPU) 131. By way of example, a CPU 131 may include one or more processor cores, which may be configured according to, e.g., a dual-core, quad-core, multi-core, architecture. Alternatively, the CPU may be based on an architecture that uses one or more main processor cores in conjunction with one or more co-processor cores, such as a Cell processor architecture. The synchronizer 102 may also include a memory 132 (e.g., RAM, DRAM, ROM, and the like). The CPU 131 may execute a synchronization program 133, portions of which may be stored in the memory 132 along with synchronization data 136. One or more media titles 106 may also be stored in the memory 132 or the mass storage 134. Alternatively, one or more media titles 106 may be stored at a remote location accessible to the synchronizer 102 over the network 160.

The synchronizer 102 may also include well-known support circuits 140, such as input/output (I/O) circuits 141, power supplies (P/S) 142, a clock (CLK) 143 and cache 144. The synchronizer 102 may optionally include a mass storage device 134 such as a disk drive, CD-ROM drive, tape drive, or the like to store programs and/or data. The synchronizer 102 may also optionally include a display unit 137 and a user interface unit 138 to facilitate interaction between the synchronizer 102 and a user who requires direct access to the synchronizer 102. The display unit 137 may be in the form of a cathode ray tube (CRT) or flat panel screen that displays text, numerals, or graphical symbols. The user interface unit 138 may include a keyboard, mouse, joystick, touch pad, touch screen, or other device. The synchronizer 102 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The synchronizer 102 may send and receive data and/or requests for files via one or more data packets over the network 160.

The preceding components may exchange signals with each other via an internal system bus 150. The synchronizer 102 may be a general purpose computer that becomes a special purpose computer when miming code that implements embodiments of the present invention as described herein.

The synchronizer 102 may be a general purpose computer that becomes a special purpose computer when running code that implements synchronization methods according to certain aspects of the present disclosure as described herein. By way of example, and not by way of limitation, the synchronizer 102 may be an electronic gaming device, such as a game console or portable gaming device, or a media playback device, such as a DVD player or a Blu-ray player. Furthermore the synchronizer may be a suitably configured general-purpose electronic device, such as a smartphone, personal computer, laptop, or tablet computer that is configured to implement the synchronization of media playback between a plurality of client device platforms through appropriate programming. Additionally, the synchronizer 102 may be one of a plurality of synchronizers implemented on a cloud-based network.

The client device platforms 103 may be configured substantially the same as the synchronizer 102. In particular, the client device platforms 103 may include a CPU 131', a memory 132', and a network interface 139'. Other components that the client device platforms 103 may have in common with the synchronizer 102 are omitted for the sake of clarity. However, components of the synchronizer 102 described above may be regarded as being included with the client device platforms 103 as if set forth explicitly herein. The client device platform 103 may be a general purpose computer that becomes a special purpose computer when miming code that implements media title playback methods according to certain aspects of the present disclosure as described herein. By way of example, and not by way of limitation, the client device platforms 103 may be an electronic gaming device, such as a game console or portable gaming device, or a media playback device, such as a DVD player or a Blu-ray player. Furthermore the client device platforms may be a suitably configured general-purpose electronic device, such as a smartphone, personal computer, laptop, or tablet computer, that is configured to implement the synchronization of media playback between a plurality of client device platforms through appropriate programming.

The client device platform 103 may have access to one or more media titles 106 that may be stored by the synchronizer 102 or accessible by the synchronizer 102 over the network 160. The media titles 106 may also be stored in the memory 132' or in the mass storage device 134' of the client device platforms 103. Additionally, one or more media titles 106 may be stored at a remote location accessible to the client device platform 103 over the network 160.

Figure 2:
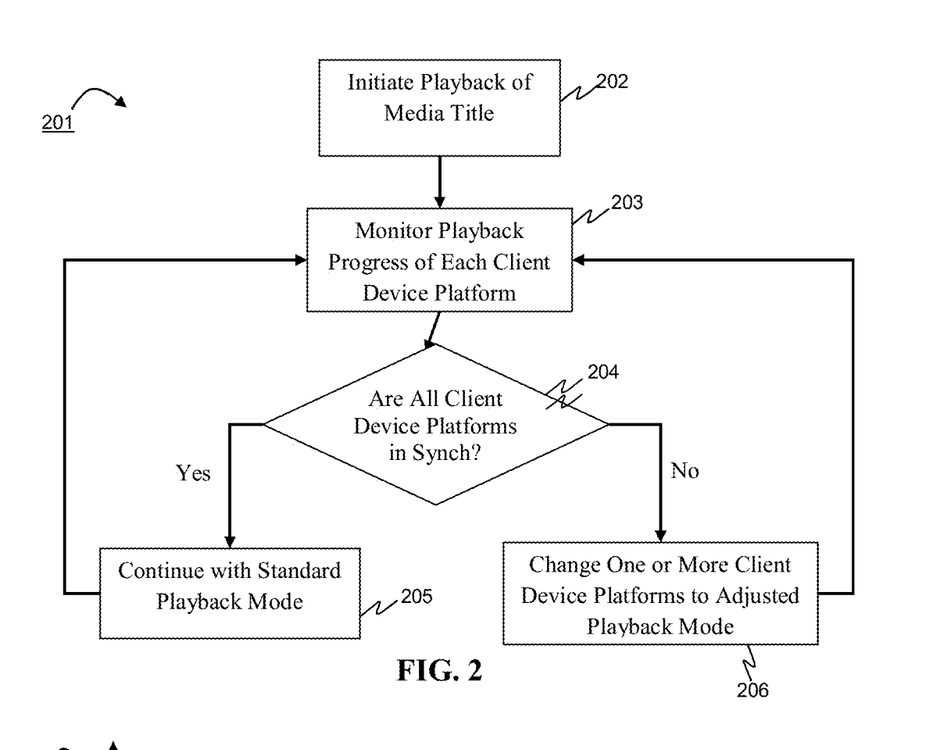
FIG. 2 is a flow diagram of a method for synchronizing the playback progress of a plurality of client device platforms according to an aspect of the present disclosure.

As shown in FIG. 2, a synchronizer 102 may be configured to implement a method 201 for synchronizing the playback progress of a plurality of client device platforms 103, in a group 104. Various aspects of this method may be implemented by execution of computer executable instructions running on the synchronizer 102. Certain other aspects may be implemented by execution of computer executable instructions running on one or more of the client device platforms 103.

Referring to the method 201 for synchronizing the playback progress of a plurality of client device platforms 103, the method may begin by initiating the playback of a selected media title 106, as indicated at 202. The initiation of the playback of the media title 106 may aid in maintaining the synchronization of the playback progress between the plurality of client device platforms. By way of example, and not by way of limitation, the media title 106 may be initiated at a predetermined scheduled start time. A group 104 of client device platforms 103 may decide that they would desire to watch a media title 106 together at their own remote locations at a specified time. One of the client device platforms 103 that is part of the group 104 may inform the synchronizer 102 of the desired start time. For example, the starting time may be scheduled for 8:00 P.M. on an upcoming Friday night. Around 8:00 P.M. on the scheduled evening, the client device platforms 103 may each establish a connection with the synchronizer 102 over the network 160. By way of example, and not by way of limitation, the connection may be established after providing log in credentials, or paying a viewer fee. The synchronizer 102 may then begin delivering the chosen media title to client device platforms 103 who have established a connection with the synchronizer 102 at 8:00 P.M. Late arrivers may still establish a connection with the synchronizer 102. These late arrivers will be able to view the media title 106 starting from the beginning even though the remainder of the group 104 has already begun viewing the title.

Further by way of example, according to aspects of the present disclosure, a media title 106 may be initiated by the synchronizer once all client device platforms 103 in a group 104 have established a connection with the synchronizer 102. By way of example, and not by way of limitation, a group list may be delivered to the synchronizer 102 by a member of the group 104 in addition to an approximate starting time for the playback to begin. Around the scheduled playback time, the members of the group 104 may establish a connection with the synchronizer. Once every member of the group 104 is connected, the synchronizer 102 may begin the playback of the chosen media title 106. Additionally, if the group 104 is still waiting for one or more members to establish a connection after a predetermined period of time after the scheduled starting time, then the playback may be initiated without the missing members of the group 104 needing to be present.

According to yet another aspect of the present disclosure, the playback of a media title 106 may be initiated once a predetermined number of client device platforms 103 have established a connection to the synchronizer 102 and requested the playback of certain media title 106. By way of example, an episode of a sitcom may be initiated once ten client device platforms 103 have established a connection with the synchronizer 102 and have requested the playback of that particular episode. This initiation aspect allows client device platforms 103 that do not have a predefined group 104 to still enjoy the shared experience of communal viewing. Additionally, providing a single starting time for the group 104 eases the burden of the synchronizer in adjusting the playback progress of each client device platform 103.

Once the media title 106 has been initiated, method 201 then continues on by monitoring the playback progress of each client device platform 103 in a group 104, as indicated at 203. Monitoring the playback progress allows the synchronizer to determine if any of the playback modes of the client device platforms 103 require adjustment. Monitoring the playback progress of each client device platform 103 may also comprise predictive monitoring. By way of example, and not by way of limitation, predictive monitoring may comprise analyzing the data transmission rates of each client device platform 103, and the actions of a user viewing a client device platform 103 in order to anticipate events that may require adjustments to the playback mode for their client device platform.

According to an aspect of the present disclosure, monitoring the playback progress of a client device platform may comprise determining if a client device platform 103 is ahead of or behind other client device platforms 103 in the group 104. By way of example, and not by way of limitation, this may be determined by comparing the frames of the media title 106 that are presently being displayed by each of the client device platforms. Additionally, the playback progress of each client device platform 103 may be determined by calculating the remaining run-time of the media title 106 for each of the client device platforms. Further, analysis of the playback progress may measure the duration of time that a client device platform 103 has paused and/or fast-forwarded the viewing of the media title 106.

According to an additional aspect of the present disclosure, the monitoring of the playback progress may also comprise predictive monitoring. Predictive monitoring is useful because it allows the synchronizer 102 to spot potential events that may require a change in the playback mode in the future. For example, if predictive monitoring detects that a large pause in the playback of the media title will likely occur in the future, the synchronizer 102 may begin adjusting the playback mode before the event occurs. Therefore, when the event does happen, the adjustment will already have been made. By way of example, and not by way of limitation, if predictive monitoring detects that in two minutes an event may cause the viewer of the client device platform 103 to be away from the screen for three minutes, then the synchronizer 102 may change the playback mode to account for the future delay. This allows for the adjustment to be made slowly over the course of several minutes instead of having to make a rapid adjustment if the break is detected only after it occurs.

According to aspects of the present disclosure, predictive monitoring may detect the presence of an abnormally large latency in the connection between a client device platform 103 and the synchronizer 102. By way of example, the latency for each client device platform may be measured by having the synchronizer 102 send a packet to each of the client device platforms 103 in a group 104 and having each client device platform 103 return the packet to the synchronizer 102. The round-trip time of the packet may be used as a measure of latency. If a client device platform 103 has a latency that is higher than the other client device platforms, then synchronizer 102 may be able to predict that the playback mode for the slower client device platform 103 may need to be altered. Therefore, the synchronizer 102 may preemptively alter the playback mode to account for the latency.

According to yet an additional aspect of the present disclosure, predictive monitoring may detect events likely to cause a delay in the playback of a media title by monitoring the communications between the client device platforms 103 within the group 104. By way of example, and not by way of limitation, phrases such as "I need a bathroom break", "The baby is crying", or "Someone is at the door", may be used by the synchronizer 102 for predictive monitoring.

Phrases like those listed above may indicate that the viewer of the client device platform 103 may need to stop viewing the media title 106 for a period of time to take care of additional responsibilities. Therefore, it may be desirable for the synchronizer 102 to begin altering the playback mode to account for these potential delays in the playback of the media title 106. The monitoring of communications may be accomplished through one or more different options. By way of example, and not by way of limitation, text communications over the network, such as text messaging, online chat messaging, or micro-blogging may be monitored for predetermined phrases. Additionally, voice recognition software may be implemented by the synchronizer 102 to monitor vocal communications sent over the network 160 for predetermined phrases.

According to yet another additional aspect of the present disclosure, predictive monitoring may detect events likely to cause a delay in the playback of a media title 106 by visually monitoring the viewers of the client device platforms 103 within the group 104. By way of example, a video camera connected to a client device platform 103 and/or connected to the network 160 may be used to see if the viewer of the client device platform has stopped viewing the screen (e.g., the viewer has left the room and cannot see the screen, or the viewer is not looking at the screen). If a viewer is no longer watching the media title 160, the synchronizer may predict that in the future, the viewer will need to rewind the playback in order to see the portions of the media title 160 that he or she missed. Rewinding the playback may cause the playback progress to be behind that of the other client device platforms 103 in the group 104. Therefore, it may be desirable to change the playback mode for that client device platform 103.

Returning to FIG. 2, once the playback progress and/or the predicted playback progress have been determined by the synchronizer 102, method 201 proceeds to determine whether each of the client device platforms 103 are in synchronization and/or are predicted to remain in synchronization as indicated by decision block 204. If the answer is yes, then method 201 continues on to block 205 and no changes are made to the playback mode of the client device platforms 103. If this branch of the method is taken, then the method continues on to block 203 again to continue monitoring the playback progress of each of the client device platforms 103. Alternatively, if the answer is no, then method 201 continues on to block 206 and the synchronizer 102 may adjust the playback mode of one or more of the client device platforms 103. Once the playback mode has been adjusted in one or more of the client device platforms, the method 201 returns back to block 203 to continue monitoring the playback progress of each of the client device platforms.

According to aspects of the present disclosure, there may be at least three playback modes. By way of example, these playback modes may include: (1) standard playback mode 312; (2) fast playback mode 314; and (3) slow playback mode 316. The standard playback mode 312 is the playback mode that may be originally assigned to each of the client device platforms 103 when they begin consuming the media title 106. If there are no synchronizing issues that need to be addressed by the synchronizer 102, then the media title 106 may not need to be altered in order to adjust the playback speed. If a client device platform 103 needs to catch up to the other client device platforms 103 in the group 104, then its playback mode may be switched from the standard playback mode 312 to the fast playback mode 314. Alternatively, if a client device platform 103 is ahead of other client device platforms 103 and needs to be slowed down, then the playback mode may be switched from the standard playback mode 312 to the slow playback mode 316.

The charts depicted in FIGS. 3A-3D illustrate the playback progress of a group 104 of client device platforms 103 in different situations. In each of the figures, the playback progress of a plurality of client device platforms 103 (C.D.P. #1, C.D.P. #2, C.D.P. #3, C.D.P. #4 . . . ) are plotted along the X-axis. Each of the vertical dashed lines represents a minute of playback progress (i.e., the number of minutes of a media title 106 that have been displayed by the client device platform 103). The shaded objects in each row represent the playback progress for each of the client device platforms 103. By way of example, in FIG. 3A client device platform numbers 2-4 each have a playback progress of two minutes, and client device platform number 1 has a playback progress of one minute. Additionally, the shaded objects designate the playback mode that has been chosen for each client device platforms 103 by the synchronizer 102. Square objects, such as those for client device platform numbers 2-4 in FIG. 3A, indicate a standard playback mode 312. Objects with an arrow to the right, such as the object for client device platform number 1 in FIG. 3A, indicate a fast playback mode 314. Objects with an arrow to the left, such as the object for client device platform number 1 in FIG. 3B, indicate a slow playback mode 316.

Figure 3A:
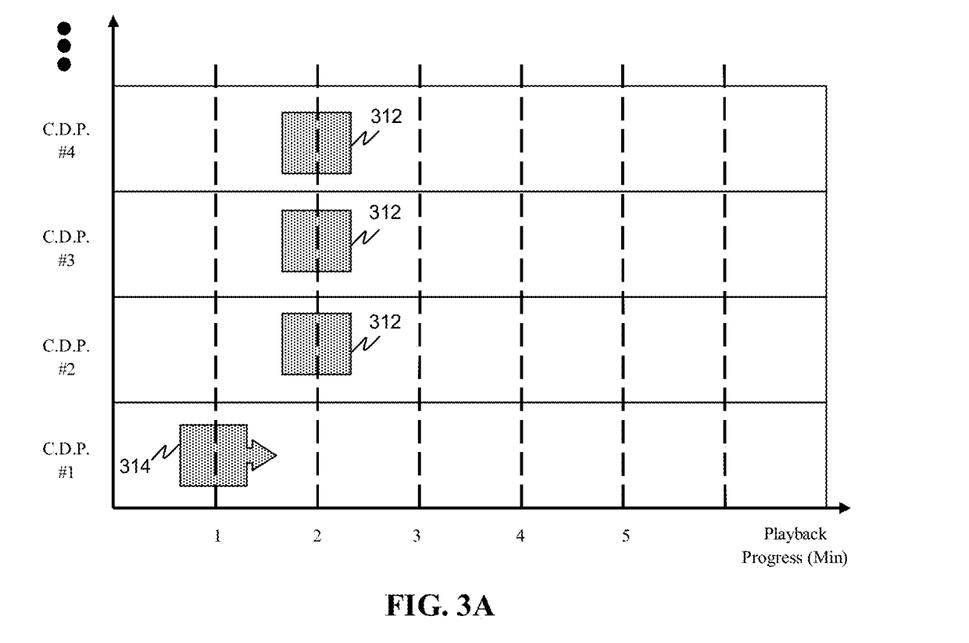
FIGS. 3A-3D are charts that depict the changes in the playback modes that need to be implemented by the synchronizer in order to synchronize the playback progress of the client device platforms according to several aspects of the present disclosure.

FIG. 3A depicts a situation where a fast playback mode 314 may be chosen by the synchronizer 102 for a client device platform 103. As shown in the figure, client device platform number 1 has a playback progress that is one minute behind that of the other client device platforms 103 in the group 104. In order to bring the entire group 104 back into synchronization, the synchronizer 102 may change the playback mode of client device platform number 1 from the standard playback mode 312 to the fast playback mode 314. The fast playback mode 314 may comprise various techniques that in combination or by themselves may speed up the playback of the media title 106. By way of example, and not by way of limitation, these techniques may include eliminating portions of the media title 106 and/or increasing the playback rate.

According to aspects of the present disclosure, eliminating portions of the media title 106 may comprise removing one or more commercials and/or reducing the length of one or more commercials. Removing one or more commercials may provide a quick adjustment to the playback progress of media title. Typically commercials are standard time lengths (i.e., 15, 30, 45, or 60 seconds). By removing one or more of the commercials, large time savings may be achieved. However, commercial time slots in a media title are often used to monetization the content being delivered to the client device platform 103. Therefore, it may not be desirable to completely eliminate the commercials. Certain aspects of the present disclosure may include the addition of banner advertisements over portions of media title if commercials are removed during the fast playback mode 314 in order to provide alternative monetization mechanisms. Alternatively, if the time savings needed to return the group 104 to a synchronized state is not as large as a standard commercial time slot, then commercials of variable length may be inserted in place of the standard commercials. By way of example, if a client device platform 103 is only 12 seconds behind the remainder of the group 104, then a commercial with a 12 second run time may be substituted for a scheduled commercial that would have had a 15 second run time.

According to additional aspects of the present disclosure, eliminating portions of the media title 106 may also comprise removing frames from the media title 106. By way of example, blank frames intermixed between frames with content may be removed. Further by way of example, certain scenes within a media title 106 that have been identified as transition scenes may be eliminated. By way of example, and not by way of limitation, transition scenes may be visually appealing, but not necessary to the understanding of the content in the media title 106, such as panning a landscape, a slow dissolve into a new scene, a freeze frame, or an opening title sequence. These scenes may be identified by the producer of the media title 106 during production, or they may be indicated as such by client device platforms 103 who have previously viewed the media title 106. Additionally, the media title 106 may have an abridged version 106' that may have non-critical scenes already removed by the producer of the media title. The fast playback mode 314 may comprise playing the abridged version 106' of the media title 106 until the client device platform 103 is back in synchronization with the rest of the group 104.

According to yet additional aspects of the present disclosure, the fast playback mode 314 may also comprise speeding up the rate of playback of the media title 106. The rate of playback may be slightly sped up for every frame until the client device platform 103 has caught up to the rest of the group 104. Alternatively, selected portions of the media title 106 may have their playback rate increased. By way of example, and not by way of limitation, transition scenes, commercials, or scenes with little or no dialog may have their playback rate increased.

It should be noted that a fast playback mode is not limited to a single playback rate. For example, if a first client device platform 103 is three minutes behind the group 104, and a second client device platform 103 is two minutes behind the group 104, then the fast playback mode 314 for the first client device platform 103 may be faster than the fast playback mode 314 for the second client device platform. The rate of playback in the fast playback mode 314 may be altered by using one or more of the previously mentioned aspects of the present disclosure.

Figure 3B:
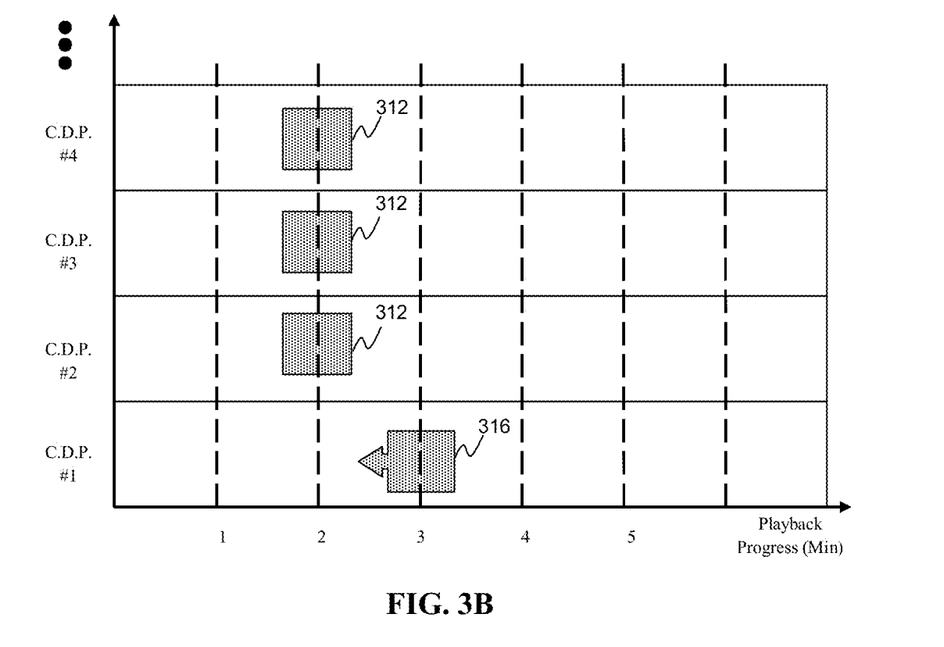

FIG. 3B depicts a graphical representation of a situation where a slow playback mode 316 may be chosen by the synchronizer 102 for a client device platform 103. As shown in the figure, client device platform number 1 has a playback progress that is a minute ahead of the other client device platforms 103 in the group 104. In order to bring the entire group 104 back into synchronization, the synchronizer 102 may change the playback mode of client device platform number 1 from the standard playback mode 312 to the slow playback mode 316. The slow playback mode 316 may comprise various techniques that in combination or by themselves may slow down the rate of playback of the media title 106. By way of example, and not by way of limitation, these techniques may include adding additional content to the media title 106 and/or reducing the playback rate.

According to aspects of the present disclosure, adding additional content to the media title 106 may comprise adding one or more commercials and/or increasing the length of one or more commercials. Adding one or more commercials may provide a quick adjustment to the playback progress of media title. Typically commercials often have standard time lengths (e.g., 15, 30, 45, or 60 seconds). By adding one or more commercials, large adjustments to the playback progress may be achieved. Alternatively, if the adjustment to the playback progress needed to return the group 104 to a synchronized state is not as large as a standard commercial time slot, then commercials of variable length may be inserted in place of the standard commercials. By way of example, if a client device platform 103 is only 8 seconds ahead of the remainder of the group 104, then a commercial with a 23 second run time may be substituted for a scheduled commercial that would have had a 15 second run time.

According to additional aspects of the present disclosure, adding additional content to the media title 106 may also comprise adding frames to the media title 106. By way of example, blank frames may be added into the media title 106. Further by way of example, certain scenes within a media title 106 that have been identified as transition scenes may be slowed down. Additionally, the media title 106 may have an extended cut version 106" that may have non-critical scenes already added in by the producer of the media title 106. The slow playback mode 316 may comprise playing the extended cut version 106" of the media title 106 until the client device platform 103 is back in synchronization with the rest of the group 104.

According to yet additional aspects of the present disclosure, the slow playback mode 316 may also comprise slowing down the rate of playback of the media title 106. The rate of playback may be slightly slowed down for every frame until the rest of the client device platforms 103 in the group 104 have caught up to the client device platform that is ahead of everyone. Alternatively, selected portions of the media title 106 may have their playback rate decreased. By way of example, and not by way of limitation, transition scenes, commercials, or scenes with little or no dialog may have their playback rate decreased. Further, if a client device platform 103 is sufficiently far ahead of the remainder of the group 104, then the slow playback mode 316 may include pausing the playback of the media title until the remainder of the group 104 catches up and becomes synchronized again.

It should be noted that a slow playback mode 316 is not limited to a single playback rate. For example, if a first client device platform 103 is three minutes ahead of the group 104, and a second client device platform 103 is two minutes ahead of the group 104, then the slow playback mode 316 for the first client device platform 103 may be slower than the slow playback mode 316 for the second client device platform. The rate of playback in the slow playback mode 316 may be altered by using one or more of the previously mentioned aspects of the present disclosure.

Figure 3C:
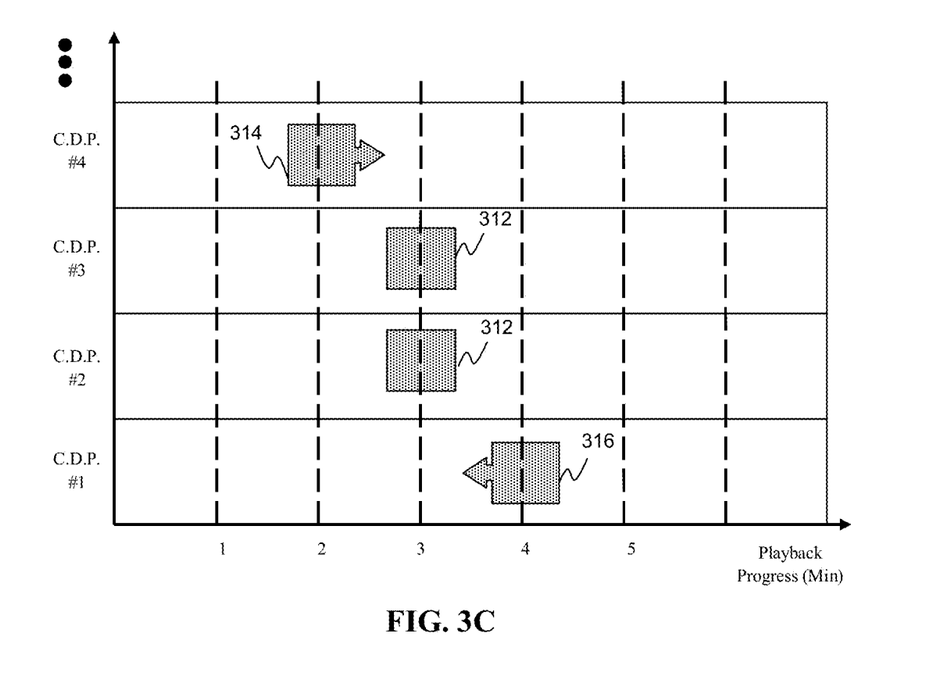

FIG. 3C graphically depicts a situation in which a synchronizer 102 utilizes both a slow playback mode 114 and a fast playback mode 116 for different client device platforms 103 within the same group 104. As shown in the figure, client device platform numbers 2 and 3 have a playback progress located at the three minute mark. Additionally, client device platform number 1 has a playback progress located a minute ahead at the four minute mark, and client device platform number 4 has a playback progress located a minute behind at the two minute mark. Instead of having three of the client device platforms having their playback mode changed to catch up to client device platform number 1, or slowed down to allow client device platform number 4 to catch up, aspects of the present disclosure allow for two of the client device platforms to have their playback modes changed. According to this example, client device platform number 4 may have its play back mode changed from the standard playback mode 312 to the fast playback mode 314, and client device platform number 1 may have its playback mode changed from the standard mode 312 to the slow playback mode 316.

Figure 3D:
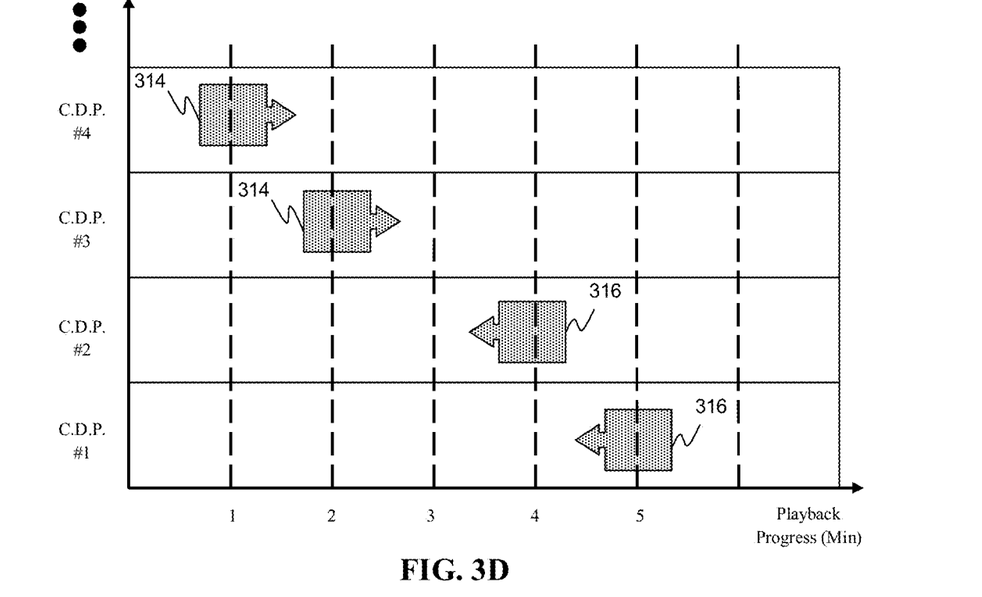

The chart shown in FIG. 3D graphically depicts a situation in which a synchronizer 102 utilizes both a slow playback mode and a fast playback mode for a plurality of client device platforms 103 within the same group 104. According to aspects of the present disclosure, the synchronizer 102 may calculate a mean playback progress of all of the client device platforms 103 in the group 104. Once the mean playback progress point is determined, the synchronizer 102 may adjust the playback modes of each of the client device platforms 103 in order to synchronize them with respect to the mean playback progress point. As shown in FIG. 3D, client device platform number 1 has a playback progress locate at the five minute mark, client device platform 2 has a playback progress located at the four minute mark, client device platform number 3 has a playback progress located at the two minute mark, and client device platform number 4 has a playback progress located at the one minute mark. Therefore, the mean playback progress of the group 104 is at the three minute mark (see equation 1).

$$\frac{(1+3+4+5)}{(1+1+1+1)} = 3 \qquad (1)$$

At regular intervals, the synchronizer 102 may determine a difference Δ between each client device platform's current playback progress point and the current mean playback progress of the group. A negative difference means that the device is behind the mean playback progress and a positive difference would mean that the device is ahead of the mean playback progress. In the foregoing example, the Δ values for client device platforms 1, 2, 3, and 4 are $\Delta_1=-2$, $\Delta_2=-1$, $\Delta_3=+1$, and $\Delta_4=+2$, respectively. The synchronizer 102 may adjust the playback progress of each client device platform in a way that minimizes its Δ value so that the client device platforms converge on the mean playback progress for the group as time progresses.

In order to adjust the playback rates so client device platforms converge on the mean playback progress, client device platforms 3 and 4 have their playback modes changed to the fast playback mode, and client device platforms numbers 1 and 2 have their playback modes changed to the slow playback mode. According to aspects of the present disclosure, the increase in the playback rate for client device platforms 3 and 4 may be the same. According to this example, client device platform number 3 will reach the mean playback point before client device platform number 4. Once client device platform number 3 is at the mean playback point, the synchronizer 102 may revert client device platform number 3's playback mode back to the standard playback mode 312. Similarly, the decrease in the playback rate for client device platforms numbers 1and 2 may be the same. Accordingly, client device platform number 2 will reach the mean playback point before client device platform number 1. Once client device platform number 2 is at the mean playback point (i.e., $\Delta_2=0$), the synchronizer 102 may revert client device platform number 2's playback mode back to the standard playback mode 312.

Alternatively, the increase in playback rate between client device platform numbers 3 and 4 may be variable. As such, the increase in the playback rate client device platform number 4 may be twice that of the increase in the playback rate of client device platform number 3. Under this example, both client device platform numbers 3 and 4 will reach the mean playback point at the same time. Similarly, the decrease in the playback rate for client device platform number 1 may be twice that of the decrease in the playback rate of client device platform number 2. As such, both client device platform numbers 1 and 2 will reach the mean playback point at the same time.

Further still, the mean playback point may be preferentially weighted to either the faster client device platforms or the slower client device platforms. By way of example, and not by way of limitation, weighting the mean playback point towards the slower client device platforms 103 may be beneficial if the content provider of the media title 106 wants to ensure that as many of the commercials are seen in their entirety as possible, or that the media title 106 is seen with minimal adjustments. For example, a weighting factor below 1.5 may added to the client device platforms that are behind the mean playback point of the group 104. Using this adjustment the weighted mean playback point may be 2.7 minutes (see equation 2).

$$\frac{((1 \times 1.5) + (2 \times 1.5) + 4 + 5)}{((1 \times 1.5) + (1 \times 1.5) + 1 + 1)} = 2.7 \qquad (2)$$

Similarly, by way of example, and not by way of limitation, weighting the mean playback point towards the faster client device platforms 103 may be beneficial if the group 104 desires to complete the viewing of the media title 106 quickly, or if there is a heavy load on the network streaming the media title 106 and the system desires to free up bandwidth as quickly as possible. For example, a weighting factor below 1.5 may be added to the client device platforms that are ahead of the mean playback point of the group 104. Using this adjustment the weighted mean playback point may be 3.3 minutes (see equation 3).

$$\frac{(1 + 2 + (4 \times 1.5) + (5 \times 1.5))}{(1 + 1 + (1 \times 1.5) + (1 \times 1.5))} = 3.3 \qquad (3)$$

Figure 4:
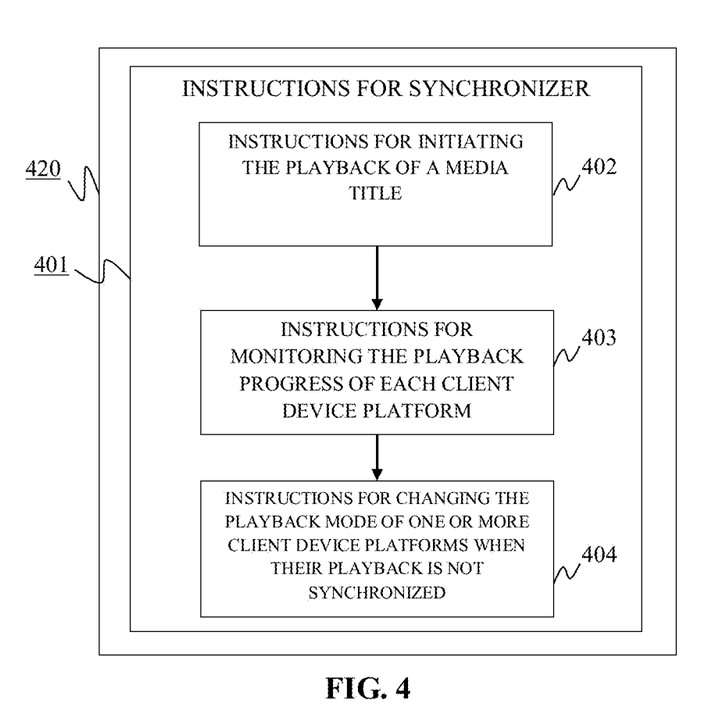
FIG. 4 is a block diagram describing the instructions for how a synchronizer may synchronize the viewing of a media title according to an aspect of the present disclosure.

As shown in FIG. 4, a set of synchronization instructions 401 may be implemented, e.g., by the synchronizer 102. The synchronization instructions 401 may be embodied in a non-transitory computer-readable medium 420 such as the memory 132 or the mass storage device 134 of the synchronizer 102. The synchronizer instructions 401 may be configured to implement the synchronization method 201 when executed by the CPU 131 of the synchronizer 102. The synchronizer instructions 401 may include instructions for initiating the playback of a media title 106 at 402. Thereafter, the instructions may include instructions form monitoring the playback progress of each client device platform 103 in the group 104 consuming the media title 106 at 403. When the synchronizer 102 detects that the playback progress of each of the client device platforms 103 is not synchronized, then the instructions may include changing one or more of the client device platforms 103 playback mode's to an adjusted playback mode at 404.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A media player configured to present media content synchronously with a group of one or more other users viewing the media content with one or more corresponding other media players, comprising:
 a processor;
 a memory coupled to the processor;
 one or more instructions embodied in the memory for execution by the processor, the instructions being configured to, when executed, cause the device to:
 continuously detect a place in time of the media player's presentation of the media content compared to the one or more corresponding other media players by communicating with the one or more corresponding media players over a network and speed up or slow down presentation of one or more frames of the media content in order to gain back synchronization with the group when the media player predicts that the media player will lose synchronization with the group of one or more other users viewing the media content on one or more corresponding other media players as a result of predictive monitoring of future events determined from observing audio or video or text messages associated with a user.

2. The media player of claim 1, wherein the event is a pausing by the media player or one or more of the one or more corresponding media players.

3. The media player of claim 1, wherein the instructions are further configured to cause the media player to synchronize presentation of the media content by
 monitoring the playback progress of the media content for the media player and each of the one or more other corresponding other media players;
 determining whether the playback progress of media player and each of the one or more other corresponding other media players are predicted to remain in synchronization; and
 changing a playback mode of one or more selected media players of the plurality of media players from a standard playback mode to an adjusted playback mode when it is determined in said determining that the playback progress for the media player and each of the one or more other corresponding other media players are predicted to not remain in synchronization.

4. The media player of claim 3, wherein changing a playback mode of one or more selected media players of the plurality of media players from a standard playback mode to an adjusted playback mode includes removing or adding frames from the media title for each of the selected media players.

5. The media player of claim 1, wherein the instructions are further configured to cause the media player to monitor presentation of the media content and predict whether presentation of the media content on the media player and the one or more corresponding other media players will remain in synchronization at a future time.

6. The media player of claim 5, wherein the instructions are further configured to cause the media player to monitor presentation of the media content by checking the media player and the one or more corresponding other media players for latency in connection.

7. The media player of claim 5, wherein the instructions are further configured to cause the media player to monitor presentation of the media content by monitoring the communications between the plurality of media players.

8. The media player of claim 7, wherein the communication is a textual communication.

9. The media player of claim 8, wherein the communication is a vocal communication.

10. The media player of claim 5 wherein the instructions are further configured to cause the media player to monitor presentation of the media content by visually monitoring one or more users of each of the plurality of media players.

11. The media player of claim 5, wherein the media player synchronization prediction is established by analyzing the data transmission rates of the media player and the one or more corresponding other media players.

12. The media player of claim 6, wherein the media player synchronization prediction is established by analyzing the latency in connection of the media player and the one or more corresponding other media players.

13. The media player of claim 7, wherein the media player synchronization prediction is established by analyzing the communications between the plurality of media players.

14. The media player of claim 10, wherein the media player synchronization predication is established by analyzing the visual data of one or more users of each of the plurality of media players.

15. The media player of claim 1, wherein speeding up or slowing down presentation of one or more frames of the media content comprises adjusting the playback rate of the presented frames.

* * * * *